INVENTORS.
LAWRENCE R. SPARROW
WILLIAM J EVANS
ATTORNEY

3,394,241
METHOD FOR WELDING DISSIMILAR METALS

Lawrence R. Sparrow and William J. Evans, Indianapolis, Ind., assignors to P. R. Mallory & Co., Inc., Indianapolis, Ind., a corporation of Delaware
Filed Nov. 4, 1965, Ser. No. 506,305
4 Claims. (Cl. 219—118)

The present invention relates to a method for welding dissimilar metals together, and more particularly relates to a method for welding dissimilar metals having a wide difference in melting point, and which in the past have been considered unweldable.

It is an object of the present invention to provide a novel method by which satisfactory welds can be obtained between dissimilar metals having widely varying characteristics.

It is a further object of the present invention to provide a method for satisfactorily welding together dissimilar metals having widely varying melting points, such as aluminum and tantalum.

Other objects of the invention and the nature thereof will become apparent from the following description considered in conjunction with the accompanying drawings wherein like reference numbers described elements of similar function therein and wherein the scope of the invention is determined rather from the dependent claims.

Figure 1:
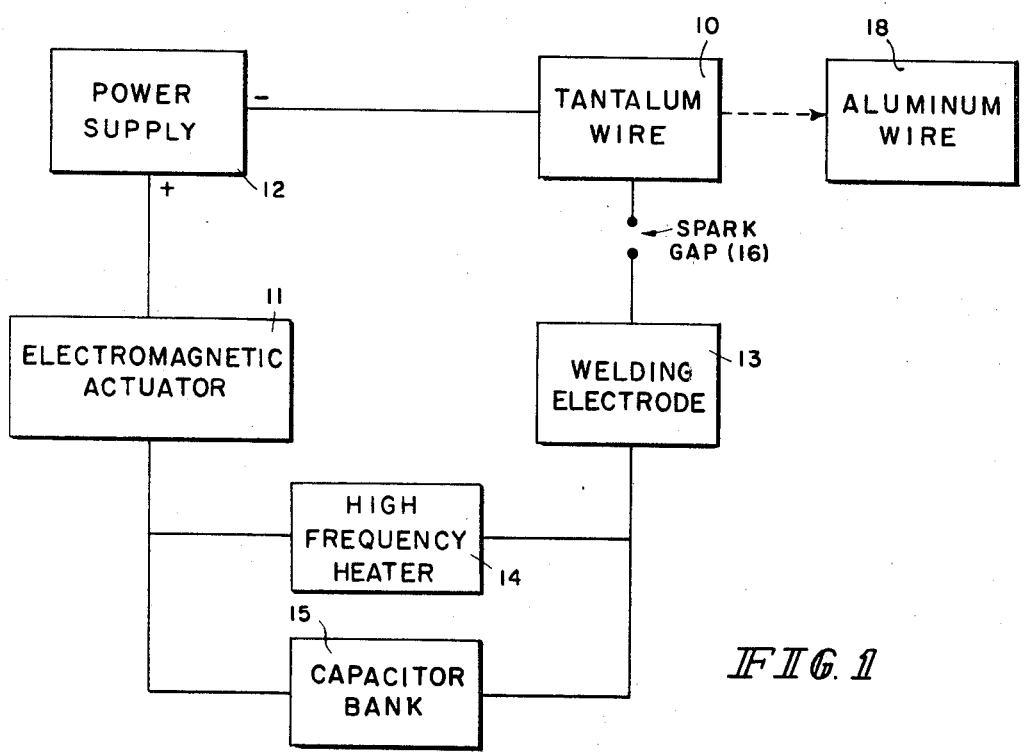
Figure 2:
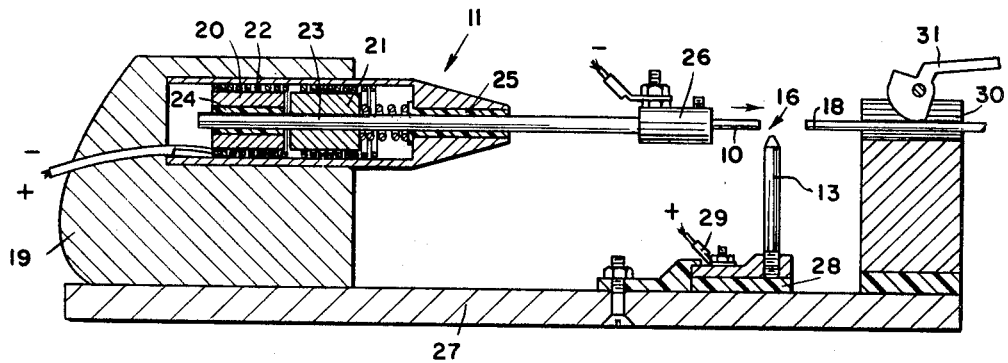

For illustrative purposes, the invention will be described with the accompanying drawings in which:

FIGURE 1 is a combination block and schematic diagram of a welding system incorporating the present invention; and FIGURE 2 is a section view of the welding system showing the space relation of the dissimilar metals prior to welding.

Generally speaking, the present invention provides a method for welding dissimilar metals having widely varying melting points wherein the welder is a conventional arc percussive power supply having a magnetic actuator adapted for carrying one of the materials to be welded. The high melting point material is held in the actuator electrode and is one side of the secondary circuit. The low melting point material is held in an insulated holder at a predetermined distance from the high melting point material. A tungsten electrode which completes the other side of the secondary circuit is held in a fixed relation to the two materials. A high frequency arc is drawn between the tungsten electrode and the high melting point material. After the ionization of the air in the arc gap, a capacitor bank in the power supply is fired. The actuator drives the high melting point material into the low melting point material. The molten condition of the high melting point material causes subsequent melting and diffusion of the low melting point material to form a braze type weld therebetween.

To illustrate the application of the present invention, reference is made to FIGURE 1, using tantalum wire as illustrative of a high melting point material, and aluminum wire as illustrative of a low melting point material. Tantalum wire 10 which is mounted on electromagnetic actuator 11, is electrically connected to the negative pole of power supply 12. Actuator 11 is electrically connected to the positive pole of the power supply. Welder 13 completes the positive pole of the circuit. A high frequency source 14 and capacitor bank 15 are interposed in parallel between the actuator 11 and the welder 13. A high frequency arc 16 is drawn between the welder electrode 17 and tantalum wire 10. After ionization of the air in the arc gap is accomplished, capacitor bank 15 fires and the actuator 11 drives tantalum wire 10 into aluminum wire which should be grounded.

FIGURE 2 illustrates a conventional arc percussive welding device adapted for use in the present invention. In arc percussive welding, an arc is passed between the two materials to be welded, causing the weld surfaces of both materials to melt. One material is then driven against the other to effect the weld. However, when the two materials have a widely differing melting point as do tantalum and aluminum, nickel and silver, or nickel and aluminum, an arc sufficient to melt the weld surface of the high melting point material would reduce a large portion of the low melting point material to a molten state rather than only the weld surface. According to the teaching of the present invention, an arc is passed only between the weld electrode 17 and the high melting point material 10. While FIGURE 2 shows the high melting point material 10 as the movable element, either one may be driven into the other one. The only requirement as to relative positionig is that the arc must go to the higher melting point material.

Electromagnetic actuator 11 is housed in insulating frame 19. The actuator has a stationary core 20, spring biased movable core 21 and coil 22. Actuator rod 23 is slidably mounted within support bushing 24 of stationary core 20 and support bushing 25, and coupled to movable core 21. Rod 23 extends from support bushing 25 and terminates in a means 26 for mounting the high melting point material 10 so that it is driven towards low melting point material 18 by the actuator, and for coupling material 18 to the power supply. The welding electrode 13 is mounted to the base 27 of frame 19 so that the arc 16 will be drawn between the electrode and the high melting point material. The mounting means 28 for electrode 13 includes lead means 29 for coupling said electrode in series with the high frequency heater 14 and capacitor bank 15 (FIGURE 1), which are in parallel with respect to each other. Lead means 30 couples the coil 21 in series with the high frequency heater and capacitor bank which are interposed between actuator 11 and electrode 13.

Aluminum wire 18 is mounted in insulating means 30 and is preferably grounded. Wire 18 is mounted and released via control means 31. As arc 16 ionizes the air between electrode 13 and tantalum wire 10, the capacitor bank fires and movable core 21 of actuator 11 drives tantalum wire 10 into aluminum wire 18, thereby effecting the weld.

The present invention is applicable for providing welds between such dissimilar metals as tantalum and aluminum, nickel and silver, nickel and aluminum, etc. It is particularly applicable where conventional braze techniques can't be utilized.

Although but a representative embodiment of the present invention is hereinabove illustrated and described, it will be apparent to those skilled in the art that various changes and modifications may be made therein without departing from the spirit or from the scope of the appended claims.

Having thus described our invention, we claim:

1. A method of welding dissimilar metals having widely differing melting points including the steps of: fixedly mounting one of said metals; mounting the other of said metals in a means for driving said metal in contact with said fixedly mounted metal so that the weld faces of each metal are aligned in a predetermined spaced apart relation with respect to each other; creating a molten condition on the weld face of the higher melting point metal; and actuating said means for driving said driven metal at a predetermined time thereby bringing the weld faces of said metals into firm contact and effecting the weld.

2. A method in accordance with claim 1 wherein said molten condition on the weld face of the higher melting point material is attained by passing a high frequency arc between said weld face and a welding electrode.

3. A method in accordance with claim 2 wherein said means for driving said driven part is actuated upon the ionization of air in the arc gap, said condition causing a capacitance bank to fire thereby actuating said driving means.

4. A method in accordance with claim 3 wherein the contacting of the molten weld face with the weld face of the lower melting point material causes said weld face of said lower melting point material to melt and diffuse therewith, thereby effecting said weld.

References Cited

UNITED STATES PATENTS

| | | | |
|---|---|---|---|
| 3,017,483 | 1/1962 | Anderson | 219—104 X |
| 3,100,254 | 8/1963 | Perkins | 219—58 |
| 3,254,194 | 5/1966 | Phillips | 219—95 |

RICHARD M. WOOD, *Primary Examiner.*

C. CHADD, *Assistant Examiner.*